(12) United States Patent
LeVan

(10) Patent No.: US 7,877,375 B1
(45) Date of Patent: Jan. 25, 2011

(54) NAME FINDING SYSTEM AND METHOD

(75) Inventor: Ralph Reese LeVan, Dublin, OH (US)

(73) Assignee: OCLC Online Computer Library Center, Inc., Dublin, OH (US)

( * ) Notice: Subject to any disclaimer, the term of this patent is extended or adjusted under 35 U.S.C. 154(b) by 237 days.

(21) Appl. No.: 11/693,329

(22) Filed: Mar. 29, 2007

(51) Int. Cl.
*G06F 7/00* (2006.01)

(52) U.S. Cl. .................. 707/713; 707/736; 707/758

(58) Field of Classification Search .......... 707/104.1, 707/100, 10, 713, 736, 758
See application file for complete search history.

(56) References Cited

U.S. PATENT DOCUMENTS

| | | | | |
|---|---|---|---|---|
| 4,453,217 A * | 6/1984 | Boivie | | 1/1 |
| 4,974,191 A * | 11/1990 | Amirghodsi et al. | | 704/8 |
| 5,148,541 A * | 9/1992 | Lee et al. | | 1/1 |
| 5,258,909 A * | 11/1993 | Damerau et al. | | 715/257 |
| 5,551,018 A * | 8/1996 | Hansen | | 1/1 |
| 6,144,958 A * | 11/2000 | Ortega et al. | | 1/1 |
| 6,401,084 B1 * | 6/2002 | Ortega et al. | | 707/706 |
| 6,405,172 B1 * | 6/2002 | Baker et al. | | 704/270 |
| 6,411,950 B1 * | 6/2002 | Moricz et al. | | 1/1 |
| 6,564,213 B1 * | 5/2003 | Ortega et al. | | 1/1 |
| 6,898,590 B1 * | 5/2005 | Streifer | | 1/1 |
| 6,904,436 B1 * | 6/2005 | Merchant et al. | | 711/2 |
| 7,099,857 B2 * | 8/2006 | Lambert | | 706/55 |
| 7,254,773 B2 * | 8/2007 | Bates et al. | | 715/256 |
| 7,296,019 B1 * | 11/2007 | Chandrasekar et al. | | 1/1 |
| 7,321,892 B2 * | 1/2008 | Vadon et al. | | 707/767 |
| 7,630,978 B2 * | 12/2009 | Li et al. | | 1/1 |
| 2002/0194229 A1 * | 12/2002 | Decime et al. | | 707/533 |
| 2006/0031239 A1 * | 2/2006 | Koenig | | 707/100 |
| 2007/0033217 A1 * | 2/2007 | Basner | | 707/102 |
| 2007/0078828 A1 * | 4/2007 | Parikh et al. | | 707/3 |
| 2007/0088679 A1 * | 4/2007 | Heffler | | 707/3 |
| 2007/0276845 A1 * | 11/2007 | Geilich | | 707/100 |
| 2008/0126389 A1 * | 5/2008 | Mush et al. | | 707/102 |
| 2008/0208812 A1 * | 8/2008 | Quoc et al. | | 707/3 |

* cited by examiner

*Primary Examiner*—Eliyah S Harper
(74) *Attorney, Agent, or Firm*—Standley Law Group LLP

(57) ABSTRACT

An improved system and method for name searching. The system and method comprise software routines and a database of names with special indexes to support name-based searches. The special indexes are created using phonetic, nicknames and misspelling algorithms. A software search routine applies progressively fuzzier searches, and ranks the intermediate results according to popularity of names and closeness of names in the query to name records in the database, eliminating unsuitable names, until a predetermined number of candidate names have been found. Highly relevant results are returned even when the user provides incomplete, errant, or exactly matching search queries for the name as indexed. The system and method may be used in any information retrieval system or service that indexes and presents names in search results.

18 Claims, 1 Drawing Sheet

NAME FINDING SYSTEM AND METHOD

CROSS-REFERENCES TO RELATED APPLICATIONS

None.

FIELD OF THE INVENTION

The present invention relates generally to software tools for searching. In particular, the present invention is a software system for optimizing search results from files that index names.

BACKGROUND OF THE INVENTION

A significant proportion of queries that library users submit to online catalogs include names. Names are used for author searches and are frequently used for subject searches. Because online catalog queries frequently include names, various attempts to optimize search results have been made.

Name search optimization techniques used in search engines and similar applications often include use of a phonetic algorithm or comparable technique that indexes words by their pronunciations. "Soundex" is an example of a well-known phonetic algorithm for indexing names by their sound when pronounced in English. Names with the same pronunciation are encoded to the same string so that matching occurs despite minor differences in spelling. While the use of Soundex and other commonly used search optimization routines tend to produce satisfactory results for a portion of name queries, they generally fail to produce satisfactory results for the full range of categories queries (i.e., partial, errant, complete) presented. Therefore, there is a need for an improved system and method for optimizing results of names searches.

SUMMARY OF THE INVENTION

The present invention is an improved system and method for name searching. The invention processes name queries by iteratively applying a two-step process to conduct progressively fuzzier searches until all candidate names have been found or the requested maximum (a definable system parameter) has been exceeded. The invention uses a step-wise process that operates slightly differently for 1) name in the form of last (or family) name, first (or personal) name; and 2) other cases. At each step, if the results produced meet or exceed the requested maximum, the system stops and presents its results.

The system comprises software routines and a database of names with special indexes to support name-based searches. A software search routine applies progressively fuzzier searches and then ranks the results, eliminating unsuitable names, until a predetermined number of candidate names have been found. A series of steps to score and rank potential results within the present invention tends to produce a high degree of satisfactory results. The relevant results are in ranked order with the most relevant name positioned high in the results list, across a wider range of commonly occurring categories of queries. It is designed for deployment in software applications where names are indexed, and it is desirable to return highly relevant results even when the user provides incomplete, errant, or exactly matching search queries for the name as indexed. The invention may be used in any computerized information retrieval system or service that indexes and presents names in search results.

DETAILED DESCRIPTION OF THE INVENTION

Figure 1:
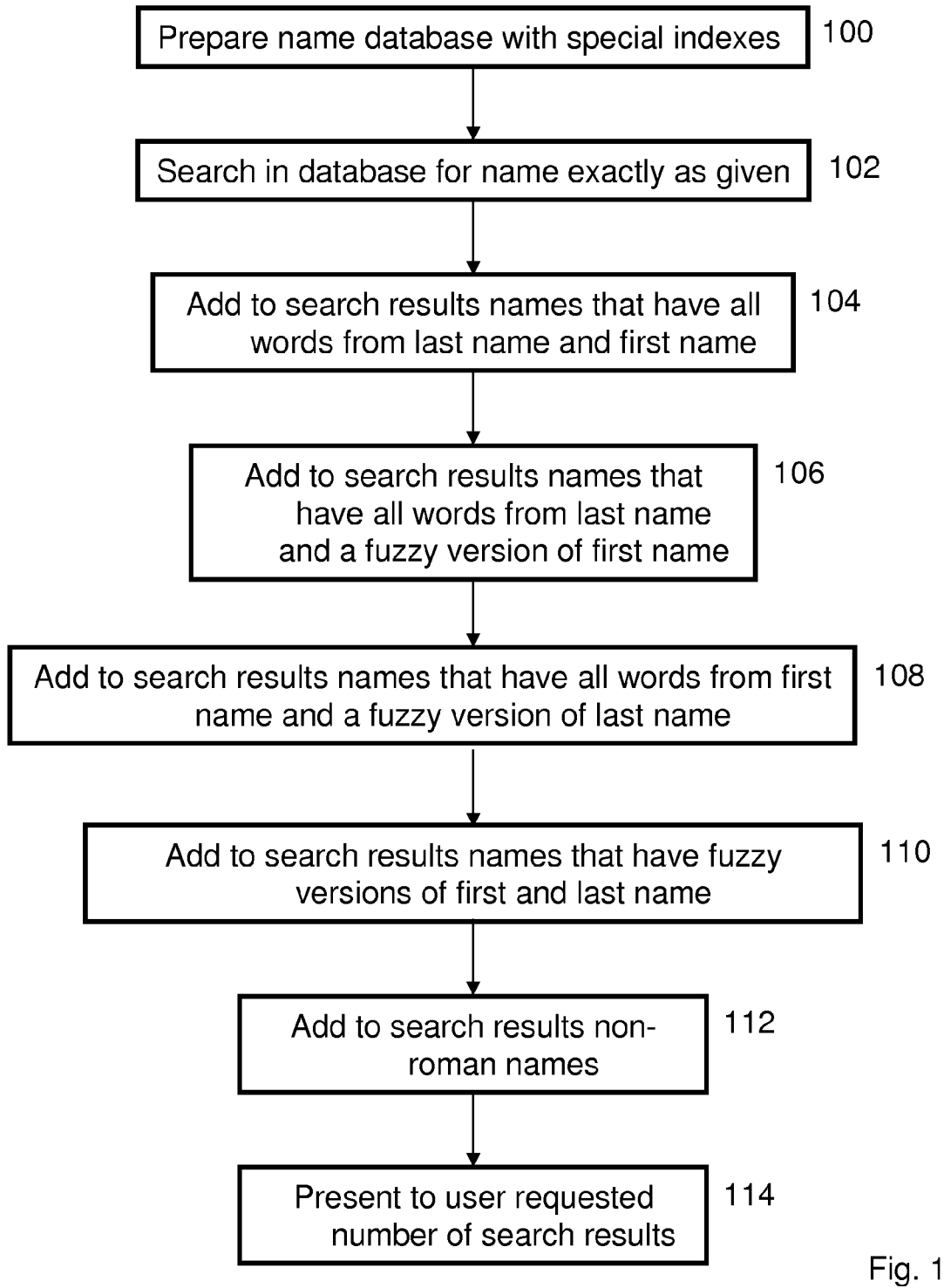
FIG. 1 is a flowchart of the primary steps for full name searching for an example embodiment of the present invention.

The improved system of the present invention for name searching operates by executing a series of steps to score and rank potential results. The system comprises two primary components: a database of names with special indexes to support searches according to the present invention and a software search routine that applies progressively fuzzier or approximate searches and then ranks the results, eliminating unsuitable names, until a predetermined number of candidate names has been found.

Referring to FIG. 1, a flowchart of the primary steps for full name searching for an example embodiment of the present invention is shown. First, special indexes for names in the database are prepared 100. NACO normalization rules are applied to names in the database to facilitate comparisons. (NACO is the name authority program component of the Library of Congress' Program for Cooperative Cataloging). For an example embodiment of the present invention, the following indexes are used:

TABLE 1

| | |
|---|---|
| PersonalName | Complete name, case shifted, and NACO normalized. |
| FamilyName | All words in name, up to first comma, case shifted, and NACO normalized. Soundex and Daitch-Mokotoff Soundex algorithms are applied. "Spelling forgiveness" algorithm is applied. |
| UnnormalizedFamilyName | All words in name, up to first comma, case shifted, but not NACO normalized. (Used to find names in non-roman scripts, e.g., Chinese, Hebrew, or Arabic.) |
| FirstName | All the words in name, after first comma, case shifted, and NACO normalized. Soundex and Daitch-Mokotoff Soundex algorithms are applied. Nicknames algorithm is applied. "Spelling forgiveness" algorithm is applied. |
| Name | All the words in name, case shifted but not NACO normalized. |
| FuzzyFirstName | All words found for FirstName, plus additional terms generated for each of those words after nicknames have been added. Daitch-Mokotoff Soundex algorithms are applied. |

The "spelling forgiveness" or misspelling algorithm is applied to single words (e.g., FamilyName or FirstName). First, the letters in the word are sorted. The sorting generates a key that forgives swapped letters. For each letter in the key, a new key is generated with that letter missing. This technique forgives single letter omissions. For example, the term 'ralph' generates the keys 'ahlpr', 'ahlp', 'ahlr', 'ahpr' and 'hlpr'. At search time, a search for the term 'ralhp' generates the key 'ahlpr' and matches records that contain 'ralph.'

A table of common nicknames is used to generate nicknames for formal names (e.g., Bob for Robert) and formal names for nicknames (e.g., Joan and Joanne for Jo).

The software search routine receives as input from a computer user or other source a name to find and a count of the maximum number of candidate names needed. It then iteratively applies a two-step process to progressively fuzzier searches until all candidate names have been found or the requested maximum has been exceeded. In an example embodiment of the present invention, the two step process consists of a search where the results are ranked by the database by popularity and the top 250 records returned. Those records are then further ranked by the software routine according to the closeness of the name in the name records to the name in the search. Candidate names that are not sufficiently close are eliminated.

Referring again to FIG. 1, the searching follows the steps identified below for full name (i.e., first and last names) searching.

1. The name is searched for exactly as given; 102
2. All names that have all the words from the last name and the first name, but not in the preceding set; 104
3. All names that have all the words from the last name and a fuzzy version of the first name, but not in the preceding sets; 106
4. All names that have all the words from the first name and a fuzzy version of the last name, but not in the preceding sets; 108
5. All names that have fuzzy versions of the first and last name, but not in the preceding sets; 110 and
6. Non-roman names are found that were not in the preceding sets. 112

Ranking is also completed at each step and unsuitable names are eliminated. The search results are then presented to the user 114. The number of results may be controlled by setting a parameter. The search method of FIG. 1 may be adapted for use when only a last name or a first name is provided. If only one term is provided, an exact search may be performed, followed by a fuzzy search, and an optional search for non-roman names.

A full name search according to the present invention for the name 'jobs, steve' produces the following results.

TABLE 2

| 1. | Jobs, Steve |
| 2. | Jobs, Steven 1955- |
| 3. | Jobs, Steven, 1955- |
| 4. | Jobs, Steven P. |
| 5. | Jobbs, Steve |
| 6. | Jost, Steve |
| 7. | Jost, Steve D. (Steve Douglas) 1954- |
| 8. | Joos, Steve |
| 9. | Njos, Steve |
| 10. | Jobe, Steven H. 1956- |
| 11. | Jobe, Steven L. |
| 12. | Jobe, Steven Lee |
| 13. | Jobe, Steven Howard |
| 14. | Jons, Steven Douglas |
| 15. | Jost, Steven Robert |
| 16. | Obst, Steven Paul |
| 17. | Kobs, Steven |
| 18. | Joos, Staf |
| 19. | Kjos, Ruth Sweet |
| 20. | Obst, Bryan Steven |

As the above search results indicate, records based on variants of the last and first names as well as exact matches for the last and first names are returned.

In another example, the following results are returned for the name 'tressle, jim.'

TABLE 3

| 1. | Tressel, Jim |
| 2. | Kessler, Jim |
| 3. | Thorsley, Jim |

TABLE 3-continued

| 4. | Bessler, John D. |
| 5. | Bessler, Joanne M. |
| 6. | Trussell, John B. |
| 7. | Kessler, Jane W. |
| 8. | Kessler, Jimmy |
| 9. | Trussel, John fl. 1620-1642 |
| 10. | Bessler, Ian |
| 11. | Rosselet, Joan |
| 12. | Kessler, Joan |
| 13. | Tessler, Diane Jane |
| 14. | Kessler, John 1951- |
| 15. | Treichler, John R. |
| 16. | Trussell, John R. |
| 17. | Gessler, Jean 1878- |
| 18. | Trokelowe, John de fl. 1330 |
| 19. | Kessler, Jon 1957- |
| 20. | Hessler, John C. (John Charles) b. 1869 |
| 21. | Trueswell, John C. |
| 22. | Kessler, John S. 1933- |
| 23. | Tressel, John |
| 24. | Kessler, Juan B. A. 1925- |
| 25. | Kessler, Jean G. |
| 26. | Dressel, Jon 1934- |
| 27. | Wessler, Jon |
| 28. | Stierle, Johann Franz Joseph |
| 29. | Tessier, John |
| 30. | Tessner, John |
| 31. | Ressler, John Q. |
| 32. | Trussel, John |
| 33. | Kessler, John F. |
| 34. | Ressler, John Quenton 1937- |
| 35. | Ressler, John Jacob 1822-1911 |
| 36. | Kessler, Jane |
| 37. | Bessler, Ian C. |
| 38. | Gessler, Jean |
| 39. | Tresling, Jan Hendrick August Theunes |
| 40. | Kessler, Jan-Joost 1958- |
| 41. | Gessler, Joan W. |
| 42. | Fessler, John F. |
| 43. | Nessler, Joan 1929- |
| 44. | Steels, Jean |
| 45. | Bessler, John Gould |
| 46. | Kessler, Joan |
| 47. | Gessler, Jan 1878-1952 |
| 48. | Dessler, John 1963- |
| 49. | Gresset, Jean Baptiste Louis 1709-1777 |
| 50. | Rosselet, Jeanne |
| 51. | Tessier, Jean 1931- |
| 52. | Gessler, Jan Baptist Frans Huibrecht |
| 53. | Tessier, Jean-Paul 1937- |
| 54. | Kessler, Jean |
| 55. | Kessler, John J. |
| 56. | Treichler, Johann Jakob 1822-1906 |
| 57. | Gessler, Jan |
| 58. | Pessler, John Christoph $17^{th}$ Cent. |
| 59. | Kessler, Johann Heinrich Hermann |
| 60. | Kessler, Jean Baptiste August 1925 |
| 61. | Kessler, John W. |
| 62. | Kessler, John |
| 63. | Kessler, Sinah |
| 64. | Tessier de Queralay, Jean-Jacques 1668-1736 |
| 65. | Tessier, Jean-Francois |
| 66. | Fessler, Jean-Marie |
| 67. | Kessler, Ian |
| 68. | Tessler, Jamie |

Once again, records based on variants of the last and first names are returned. If the results parameter is a large number, the user may see many variants that were considered in the search.

As the example searches indicate, the database indexes and software search routine of the present invention assist a computer user who does not know how to spell the name of a person of interest by considering and presenting to the computer user many variants. The special indexes and search routine of the present invention help a computer user to locate relevant name records, even if the user misspells the name in a variety of ways or uses a nickname instead of the formal name. The computer user may peruse the results on the computer display and find the person of interest in the results, even with little knowledge about how the person's name is spelled. The spelling variants that are considered in the search help to locate many records, any one of which may have information about the actual person of interest.

While certain exemplary embodiments are described in detail above, the scope of the application is not to be considered limited by such disclosure, and modifications are possible without departing from the spirit of the invention as evidenced by the following claims:

The invention claimed is:

1. A computerized method for optimizing name search results for a computer user comprising:
   (a) creating at a computer for a name database indices comprising:
      (i) a phonetic index with terms generated from application of at least one phonetic algorithm to first names and to last names in said database;
      (ii) a nickname index with terms generated from application of at least one nickname algorithm to first names in said database;
   (b) creating at said computer for said name database a misspelling index with keys for finding names in said database by applying a misspelling algorithm to first names and to last names wherein the algorithm:
      (i) alphanumerically sorts the letters in said first names and last names;
      (ii) generates a first key for each of said first names and said last names comprising letters for said first name or last name in alphanumeric sorted order; and
      (iii) removes each letter of said first name or last name in alphanumeric sorted order to generate additional keys comprising said first key with said letters removed from said first key;
   (c) receiving at said computer a search request comprising a first name and a last name;
   (d) receiving at said computer a candidate number of names from said database;
   (e) creating at said computer a search results set by adding names to said search results set for said first name and said last name up to said candidate number of names according to the following steps:
      (i) searching said name database for an exact match of said first name and said last name;
      (ii) searching said name database for names that have all words from said last name and said first name but not in said search results set;
      (iii) searching said name database for names that have all words from said last name and a fuzzy version of said first name using said phonetic, nickname, and misspelling indices but not in said search results set;
      (iv) searching said name database for names that have all words from said first name and a fuzzy version of said last name using said phonetic and misspelling indices but not in said search results set;
      (v) searching said name database for names that have fuzzy versions of said first name and said last name using said phonetic, misspelling, and nickname indices but not in said search results set;
      (vi) ranking intermediate results at each step (i)-(v) and eliminating a plurality of names from said search results set according to said rankings for said names; and
   (f) presenting to said computer user on a computer display names from said search results set up to said candidate number of names.

2. The method of claim 1 wherein said names in said database are normalized, case shifted words.

3. The method of claim 1 wherein said phonetic algorithm is selected from the group consisting of the Soundex algorithm and the Daitch-Mokotoff Soundex algorithm.

4. The method of claim 1 wherein said nicknames algorithm comprises the following steps:
   (a) preparing a text file of formal names and nicknames;
   (b) inverting said file such that nicknames map to formal names and to nicknames for said formal names; and
   (c) generating multiple keys for first names for all possible nicknames and formal names related to said first names.

5. The method of claim 1 wherein ranking intermediate results comprises:
   (a) ranking said names in said search results set by popularity; and
   (b) ranking said names in said search results set according to closeness of said first name and said last name to name records in said database.

6. A computerized system for presenting to a computer user optimized name search results comprising:
   (a) a name database at a computer with a plurality of indexes comprising:
      (i) a phonetic index with terms generated from application of at least one phonetic algorithm to first names and last names in said database;
      (ii) a nickname index with terms generated from application of at least one nickname algorithm to first names in said database;
      (iii) a misspelling index with terms generated from application of at least one misspelling algorithm to first names and last names in said database wherein said algorithm:
         (A) alphanumerically sorts letters for each of said first names and last names;
         (B) generates a first key for each of said first names and said last names comprising letters for said first name or last name in alphanumeric sorted order;
         (B) removes each letter of said first name or last name in alphanumeric sorted order to generate additional keys comprising said first key with said letters removed from said first key;
   (b) memory at said computer for storing a search results set created at said computer by adding names to said search results set for a first name and a last name search request up to a candidate number of names from said database, said search results set created according to the following steps:
      (i) searching said name database for an exact match of said first name and said last name;
      (ii) searching said name database for names that have all words from said last name and said first name but not in said search results set;
      (iii) searching said name database for names that have all words from said last name and a fuzzy version of said first name using said phonetic, nickname, and misspelling indices but not in said search results set;
      (iv) searching said name database for names that have all words from said first name and a fuzzy version of said last name using said phonetic and misspelling indices but not in said search results set;
      (v) searching said name database for names that have fuzzy versions of said first name and said last name using said phonetic, nickname, and misspelling indices but not in said search results set;

(vi) ranking said intermediate results at each step (i)-(v) and eliminating a plurality of names from said search results set according to said rankings for said names; and (c) a computer display for presenting to said computer user names from said search results set up to said candidate number of names.

7. The system of claim 6 wherein said names in said database are normalized, case shifted words.

8. The system of claim 6 wherein said phonetic algorithm is selected from the group consisting of the Soundex algorithm and the Daitch-Mokotoff Soundex algorithm.

9. The system of claim 6 wherein said nicknames algorithm comprises the following steps:
   (a) preparing a text file of formal names and nicknames;
   (b) inverting said file such that nicknames map to formal names and to nicknames for said formal names; and
   (c) generating multiple keys for first names for all possible nicknames and formal names related to said first names.

10. The system of claim 6 wherein ranking intermediate results comprises:
    (a) ranking said names in said search results set by popularity; and
    (b) ranking said names in said search results set according to closeness of said first name and said last name to name records in said database.

11. A computerized method for optimizing name search results for a computer user comprising:
    (a) creating at a computer for a name database a phonetic index with terms generated from application of at least one phonetic algorithm to first names and to last names in said database;
    (b) creating at said computer for said name database a nickname index with terms generated from application of at least one nickname algorithm to first names in said database;
    (c) creating at said computer for said name database a misspelling index with terms generated by applying a misspelling algorithm to first names and to last names wherein said misspelling algorithm generates:
       (i) a first key for each of said first names and said last names comprising letters for said first name or last name in alphanumeric sorted order; and
       (ii) for each letter of said first name or last name, an additional generated key comprising said first key with said letter removed from said first key;
    (d) receiving at said computer a search request comprising a first name and a last name;
    (e) receiving at said computer a candidate number of names from said database;
    (f) creating at said computer a search results set by adding names to said search results set for said first name and said last name up to said candidate number of names according to the following steps:
       (i) searching said name database for an exact match of said first name and said last name;
       (ii) searching said name database for names that have all words from said last name and said first name and that are not in said search results set;
       (iii) searching said name database for names that have a fuzzy version of said last name and said first name using said phonetic, nickname, and misspelling indices and that are not in said search results set;
       (iv) ranking intermediate results at each step (i)-(iii) and eliminating a plurality of names from said search results set according to said rankings for said names; and
    (g) presenting on a computer display names from said search results set up to said candidate number of names.

12. The method of claim 11 wherein said names in said database are normalized, case shifted words.

13. The method of claim 11 wherein said phonetic algorithm is selected from the group consisting of the Soundex algorithm and the Daitch-Mokotoff Soundex algorithm.

14. The method of claim 1 wherein said nicknames algorithm comprises the following steps:
    (i) preparing a text file of formal names and nicknames;
    (ii) inverting said file such that nicknames map to formal names and to nicknames for said formal names; and
    (iii) generating multiple keys for first names for all possible nicknames and formal names related to said first names.

15. The method of claim 11 wherein ranking intermediate results comprises:
    (i) ranking said names in said search results set by popularity; and
    (ii) ranking said names in said search results set according to closeness of said first name and said last name to names in said database.

16. The method of claim 11 wherein receiving at said computer a search request comprising a first name and a last name comprises receiving a search request comprising a misspelled first name or last name.

17. The method of claim 1 wherein receiving at said computer a search request comprising a first name and a last name comprises receiving a search request comprising a misspelled first name or last name.

18. The system of claim 6 wherein said first name and last name search request comprises a misspelled first name or last name.

* * * * *